Dec. 18, 1934. W. E. WILSON Re. 19,403

PACKAGE

Original Filed April 8, 1933

INVENTOR.
Walter E. Wilson.
BY Arthur M. Smith
ATTORNEY.

Reissued Dec. 18, 1934

Re. 19,403

UNITED STATES PATENT OFFICE 19,403

PACKAGE

Walter E. Wilson, Detroit, Mich,

Original No. 1,950,203, dated March 6, 1934, Serial No. 665,049, April 8, 1933. Application for reissue March 22, 1934, Serial No. 716,814

16 Claims. (Cl. 41—4)

My invention relates to a package and more particularly to an improved package adapted for use in connection with the packaging of merchandise contained in bottles, such as inks, show-card colors, etc. It is particularly adaptable to any package in which it is desired to maintain a plurality of bottles in the package in an upright position in a manner to permit ready access to the contents of the bottle without removal of the bottle from the package.

In the particular embodiment here shown my invention is shown as applied to a child's paint set in which a number of liquid colors are placed in a plurality of bottles which are maintained in the package embodying my invention.

The sale of merchandise in small bottles is highly desirable in a large number of classes of merchandise. Frequently, also, it is desirable to sell a plurality of such bottles in a single package. Prior to my invention such packages have not been desirable from the standpoint of the customer or user of the merchandise contained in the bottles, because of the difficulty of removing the stoppers from the bottles and the maintaining of the bottles in an upright position.

It also has been found with such merchandise, particularly with children's paint sets in which liquid colors are sold in a plurality of small bottles, that it is difficult to maintain the bottles in an upright position during use due, many times, to the unevenness of the surface upon which the bottles are to be used and due also to the relative smallness of the bottoms of the bottles commonly employed in sets of this type.

It is, therefore, an object of my present invention to provide a package particularly adapted for the packaging of merchandise contained in a plurality of bottles and in which the bottles are securely held in an upright position at all times.

It is a further object of my present invention to provide a package in which a plurality of bottles are so held in an upright position that the stoppers or caps thereof may be removed without removing the bottles from the package and without requiring a manual holding of the bottles.

These and various other objects, features of arrangement, construction and operation, are plainly shown and described and will be best understood by reference to the accompanying drawing, in which.

Similar reference numerals refer to similar parts throughout the several views.

Figure 1:
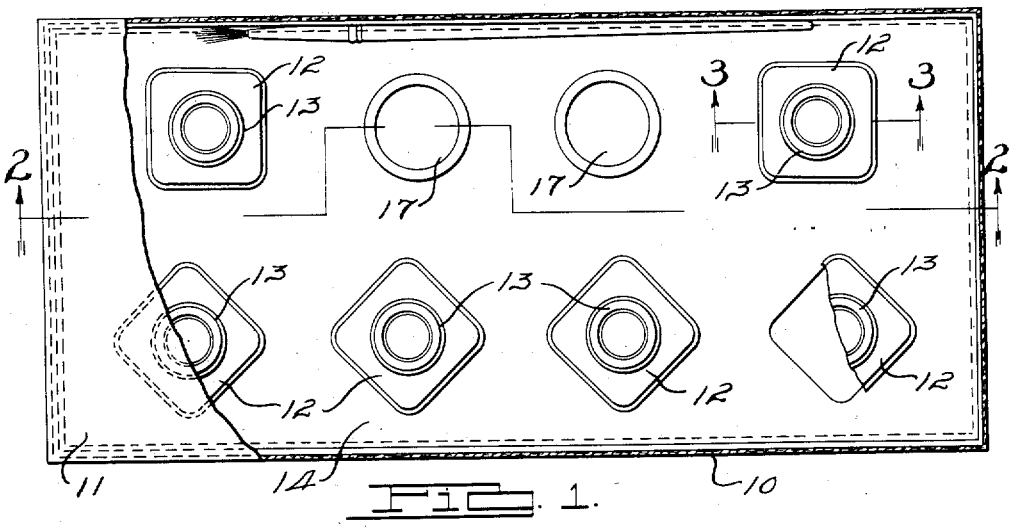
Fig. 1 is a top plan view with a portion of the cover broken away showing a package embodying my invention adapted for use as a paint set.
Figure 2:
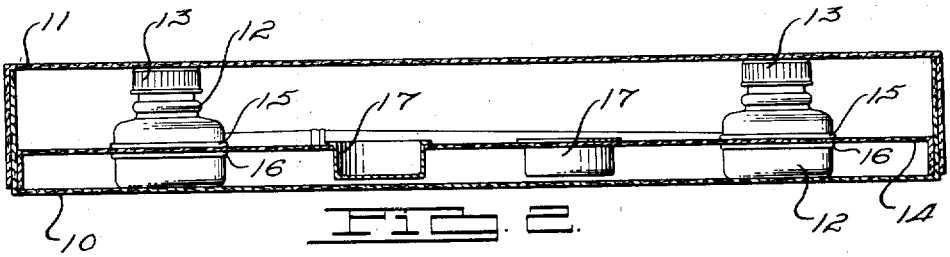
Fig. 2 is a staggered sectional view taken on the line 2—2 of Fig. 1.
Figure 3:
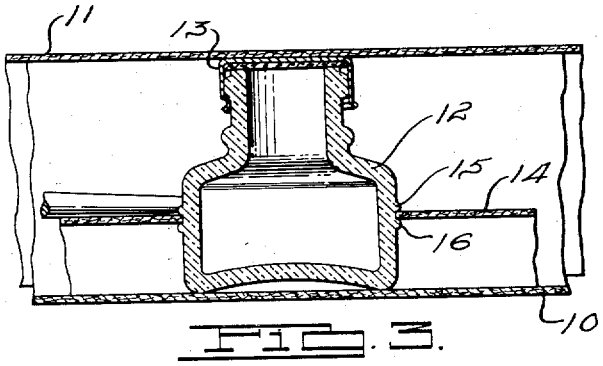
Fig. 3 is an enlarged fragmentary sectional view taken on the line 3—3 of Fig. 1.

Referring more in detail to the drawing, 10 designates the bottom portion of a box of conventional design on which is placed a telescoping cover 11, also of conventional design. A plurality of bottles 12 contain the merchandise to be sold. The depth of the box 10 is proportioned to the height of the bottles 12 in such a manner that when the telescoping cover portion 11 is in place to close the box, it contacts with the top of the plurality of caps 13 secured to the plurality of bottles 12 (Figs. 2 and 3).

Placed in the bottom portion 10 of the box is a partition 14. A plurality of openings of suitable size and shape corresponding to the size and shape of the bottles 12 to be contained therein is provided in the partition 14. Each of the plurality of bottles 12 is provided with locking means 15 and 16 formed as an integral part of the bottle 12. The openings in the partition 14 are so arranged that the partition 14 extends to the surface of the bottle 12 at a point between the locking means 15 and the locking means 16 integral with the body of the bottles 12.

In the particular adaptation here shown, a plurality of pans 17 also are provided and are pressed through suitable openings in the partition member 14.

In assembling a package embodying my invention, each of the bottles 12 is filled with the merchandise to be sold therein and is then forced through the openings in the partition 14 with a distortion of the partition 14. The partition 14 is formed preferably of cardboard of similar material so that it will yield slightly as the locking means 16 is forced downwardly through the opening provided in the partition 14. The material employed to form the partition 14 should be of sufficient resiliency to restore itself to its normal position so that the edges of the opening in the partition 14 will engage the bottle 12 at a point between the locking means 15 and the locking means 16.

A package embodying my invention thus makes available to the user the contents of any one of the plurality of bottles packed therein without affecting the accessibility of any other bottle in the package. The construction of the partition member 14 cooperating with the locking means 15 and 16 serves to maintain the bottles 12 in a predetermined upright position in the package. By providing a bottle of a shape other than circular as here shown, it is possible to remove any one of the screw caps 13 from any one of the plurality of bottles 12 without turning the bottle in the package and without removal of the bottle from the package.

A package embodying my invention also facilitates the shipping of merchandise packed in a plurality of small containers, particularly when arranged in the package as shown in the embodiment of my invention set forth in the drawing and described in this specification. The cover 11, telescoping over the bottom portion 10, contacts with the plurality of caps 13 on the plurality of bottles 12 and serves to prevent loosening of the caps on any of the bottles contained therein.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States is:

1. A package for a paint set or the like comprising a box having a flat bottom, a spacer partition sheet supported in the box in spaced relation above said bottom and substantially parallel thereto, said sheet having a rectilinear opening therein, a rectilinear bottle adapted to extend through said opening and having opposed vertical sides engaging the opposed side edges of the opening, and parallel horizontal ribs projecting outwardly from said sides and engaging opposite faces of the partition sheet along said edges to resist tilting movement of the bottle when supported within said opening.

2. A package for a paint set or the like comprising a box having a flat bottom, a spacer partition sheet supported in the box in spaced relation above said bottom and substantially parallel thereto, said partition sheet being formed of flexible material and having a rectilinear opening therein, a rectilinear bottle adapted to extend through said opening and having opposed vertical sides engaging the opposed side edges of the opening, and parallel horizontal ribs projecting outwardly from said sides, the said edges of said opening being sprung into interlocked position between said ribs and engaged by said ribs to maintain said bottle against tilting movement when supported within said opening.

3. A package for a paint set or the like comprising a box having a flat bottom, a spacer partition sheet supported in the box in spaced relation above said bottom and substantially parallel thereto, said partition sheet being formed of flexible material and having a rectilinear opening therein, a rectilinear bottle adapted to extend through said opening and having opposed vertical sides engaging the opposed side edges of the opening, and parallel horizontal ribs projecting outwardly from said sides, the said edges of said opening being sprung into interlocked position between said ribs by movement of the bottle in a substantially vertical direction relative to the partition and engaged by said ribs to maintain said bottle against tilting movement when supported within said opening.

4. A package adapted for a paint set or the like and including a plurality of rectilinear bottles maintained in upright position in a box, each of said bottles having opposite vertically extending sides, a plurality of outwardly extending spaced ribs formed integrally with the sides of each of said bottles and extending outwardly from the surfaces of said sides on lines substantially parallel with a line extending through the bottom of the bottle at a point approximating the center of gravity thereof.

5. A package adapted for a paint set or the like and including a plurality of bottles adapted to contain liquid paints, a box, a spacer partition therein, each of said bottles having a plurality of spaced parallel ribs extending outwardly from the sides thereof on lines extending through the approximate center of gravity thereof and adapted to be interlocked with said spacer partition and to cooperate therewith to maintain each of the bottles in upright position and against tilting movement in said box.

6. A paint set including a plurality of rectilinear bottles containing different colors of liquid paints, a box, a spaced partition formed of a sheet of flexible material having a plurality of spaced rectilinear openings therein and secured to said box in spaced relation to the bottom thereof, each of said bottles having outwardly extending flanges integral with the sides thereof at the approximate center of gravity thereof and adapted to be sprung into interlocked position in the openings in said partition and to engage the opposite faces of said partition at said openings, thereby to maintain each of said bottles against tilting movement and in a predetermined position in said box.

7. A paint set including a plurality of rectilinear bottles having opposed vertically extending sides, a plurality of spaced outwardly extending ribs integral with the sides of each of said bottles at the approximate center of gravity thereof, a box portion, a spaced partition formed of a sheet of flexible material secured to said box portion in spaced relation to the bottom of said box and having a plurality of rectilinear openings therein corresponding in shape to the shape of said bottles but having slightly smaller dimensions than the outer dimensions of the said flanges, the edges of said openings being adapted to be sprung into interlocked position between the outwardly extending flanges of said bottles, thereby to maintain said bottles against tilting movement and in a predetermined position in said box.

8. A paint set including a plurality of substantially square bottles containing different colors of liquid paints, a box, a spaced partition formed of a sheet of flexible material having a plurality of substantially square openings therein secured in said box in spaced relation to the bottom thereof and extending on a line substantially parallel thereto, a pair of spaced ribs extending outwardly from the sides of each of said bottles at the approximate center of gravity thereof, the said ribs being adapted to engage the opposite faces of said partition adjacent the openings therein when the edges of the openings of said partition member are sprung into interlocked relation with said ribs.

9. A paint set including a plurality of substantially square bottles containing different colors of liquid paints, a box, a spaced partition formed of a sheet of flexible material having a plurality of substantially square openings therein secured in said box in spaced relation to the bottom thereof and extending on a line substantially parallel thereto, a pair of spaced ribs extending outwardly from the sides of each of said bottles at the approximate center of gravity thereof, the said ribs being adapted to engage the opposite faces of said partition adjacent the openings therein when the edges of the openings of said partition member are sprung into interlocked relation with said ribs by movement of the bottles in a substantially vertical direction relative to said partition.

10. A package including a plurality of bottles, a box, a spacer partition having bottle securing openings therein, each of said bottles having a bead extending outwardly from the sides thereof on a line extending through the approximate center of gravity thereof and adapted to be interlocked with said spacer partition and to cooperate therewith to maintain each of the bottles in upright position to resist substantial tilting movement in said box and to resist but not prevent vertical withdrawal therefrom.

11. A package comprising a bottle having upright rectilinear side walls, a carton surrounding said bottle and having a spacer element therein provided with an opening adapted to receive said bottle upon vertical insertion of the latter into the opening, said opening having rectilinear edges conforming to said rectilinear side walls and contacting therewith to maintain the bottle in upright position within the opening and to resist turning movement of the bottle within the opening, said bottle having a bead or beads projecting outwardly from a rectilinear wall or walls thereof and adapted to lap an edge or edges of said opening to resist removal of the bottle from the opening.

12. A package comprising a bottle having upright rectilinear side walls, a carton surrounding said bottle and having a spacer element therein provided with an opening adapted to receive said bottle upon vertical insertion of the latter into the opening, said opening having rectilinear edges conforming to said rectilinear side walls and contacting therewith to maintain the bottle in upright position within the opening and to resist turning movement of the bottle within the opening, said bottle having a circumferential bead projecting outwardly from the rectilinear walls thereof and adapted to lap the edges of said opening to resist tilting of the bottle in the opening and to interlock said bottle in said spacer.

13. A package comprising a bottle having upright rectilinear side walls, a carton surrounding said bottle and having a spacer element therein provided wtih an opening adapted to receive said bottle upon vertical insertion of the latter into the opening, said opening having rectilinear edges conforming to said rectilinear side walls and contacting therewith to maintain the bottle in upright position within the opening and to resist turning movement of the bottle within the opening, said bottle having a circumferential bead projecting outwardly from the rectilinear walls thereof on a line passing substantially through the approximate center of gravity of said bottle when filled and adapted to lap the edges of said opening to resist tilting of the bottle in the opening and to interlock said bottle in said spacer.

14. In a package comprising a carton having a spacer element therein and in which the spacer element is provided with an opening having rectilinear edges; a bottle having upright rectilinear side walls conforming to said rectilinear edges of the opening and adapted to be vertically inserted into the opening for confinement therein by contact with said edges, said side walls having beads projecting outwardly therefrom and adapted to lap the adjacent rectilinear edges of said opening whereby cooperation of said edges with said side walls and beads is effective to maintain the bottle in upright position in the carton and to resist turning movement thereof within said opening.

15. In a package comprising a carton having a spacer element therein and in which the spacer element is provided with an opening having rectilinear edges; a bottle having upright rectilinear side walls conforming to said rectilinear edges of the opening and adapted to be vertically inserted into the opening for confinement therein by contact with said edges, said side walls having beads projecting outwardly therefrom on lines passing substantially through the approximate center of gravity of the bottles when filled and adapted to lap the adjacent rectilinear edges of said opening whereby cooperation of said edges with said side walls and beads is effective to resist substantial tilting of the bottle in the carton or turning movement thereof within said opening.

16. In a package comprising a carton having a spacer element therein and in which the spacer element is provided with an opening having rectilinear edges; a bottle having upright rectilinear side walls conforming to said rectilinear edges of the opening and adapted to be vertically inserted into the opening for confinement therein by contact with said edges, a circumferential bead projecting outwardly from said side walls and adapted to lap the adjacent rectilinear edges of said opening and cooperating therewith to resist substantial tilting of the bottle in the carton or turning movement thereof within said opening.

WALTER E. WILSON.